United States Patent [19]

Wright

[11] Patent Number: 4,762,868

[45] Date of Patent: Aug. 9, 1988

[54] COATED FRONT COPY PAPER

[75] Inventor: Adrian G. Wright, Devonport, Australia

[73] Assignee: North Broken Hill Limited, Burnie, Australia

[21] Appl. No.: 873,974

[22] Filed: Jun. 13, 1988

[30] Foreign Application Priority Data

Jun. 13, 1985 [AU] Australia .............................. PH1016

[51] Int. Cl.⁴ ......................... B32B 9/04; C08L 89/00
[52] U.S. Cl. ........................................ 524/17; 524/18;
524/47; 524/52; 428/530; 428/531; 427/411
[58] Field of Search ...................... 524/17, 18, 47, 49, 524/52, 53; 428/524, 530, 531; 427/411; 527/101

[56] References Cited

U.S. PATENT DOCUMENTS 4,091,130  5/1978  Shaw .................................... 427/358
4,602,264  7/1986  Shiri et al. ........................... 428/914

Primary Examiner—Delbert R. Phillips
Assistant Examiner—Nathan M. Nutter
Attorney, Agent, or Firm—Cushman, Darby & Cushman

[57] ABSTRACT

A coating composition for coated front copy papers comprises pre-treated carboxylated soybean protein, pigment, binder, phenolic resin, and defoamer. In a preferred embodiment, the carboxylated soybean protein is pre-treated by the steps of:

(a) adding carboxylated soybean protein to water in a mixer,
(b) continuing mixing to achieve an even dispersion,
(c) heating the dispersion to a temperature of 58°–65° C. while continuing mixing,
(d) adding sufficient ammonia solution to neutralize the carboxylic acid groups in the protein, and
(e) maintaining the temperature in the range 58°–65° C. until the reaction is complete as indicated by pH, or by complete dissolution of the protein, and
(f) adding defoamer and mixing by gentle agitation.

A method for coating paper is also claimed.

16 Claims, 6 Drawing Sheets

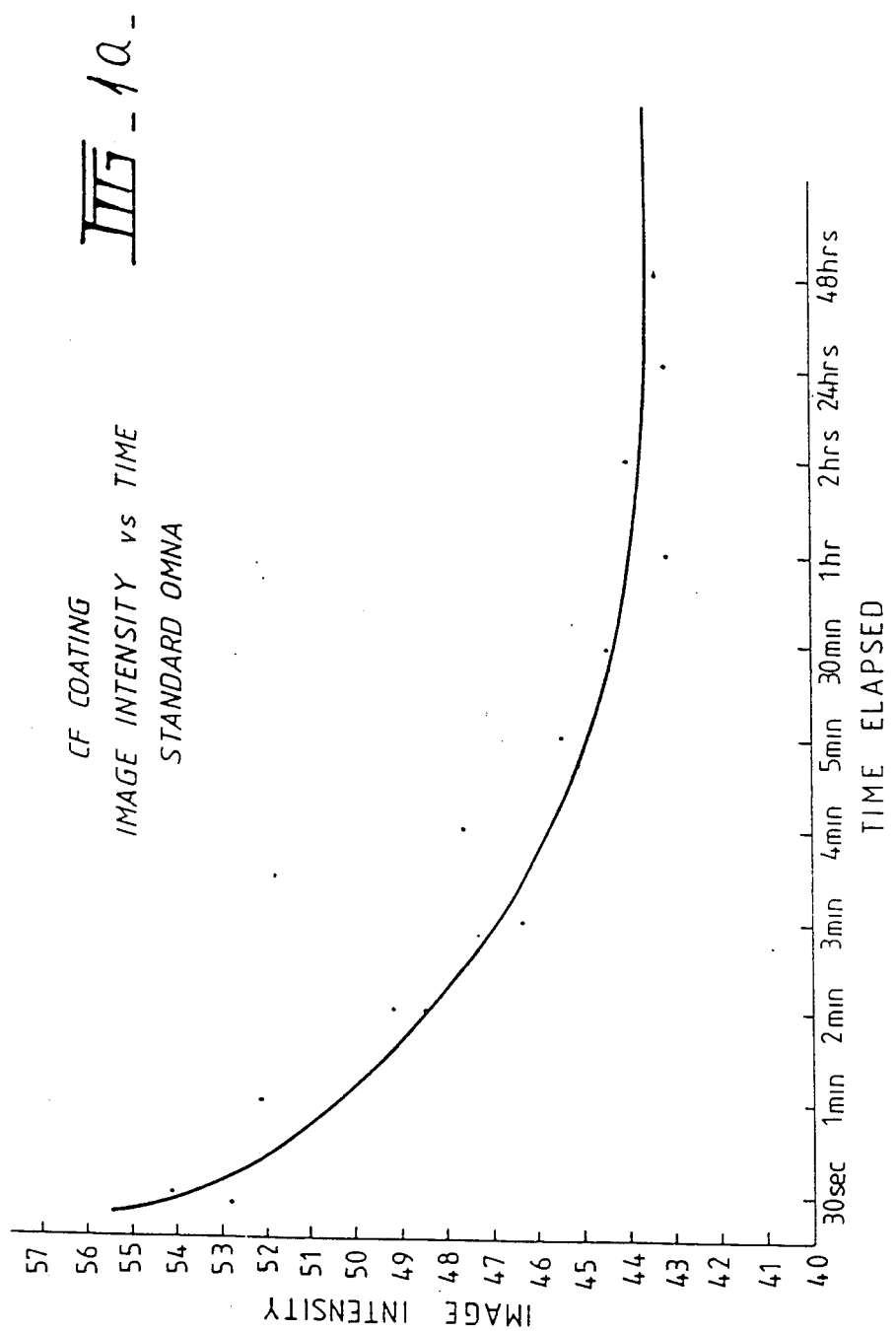

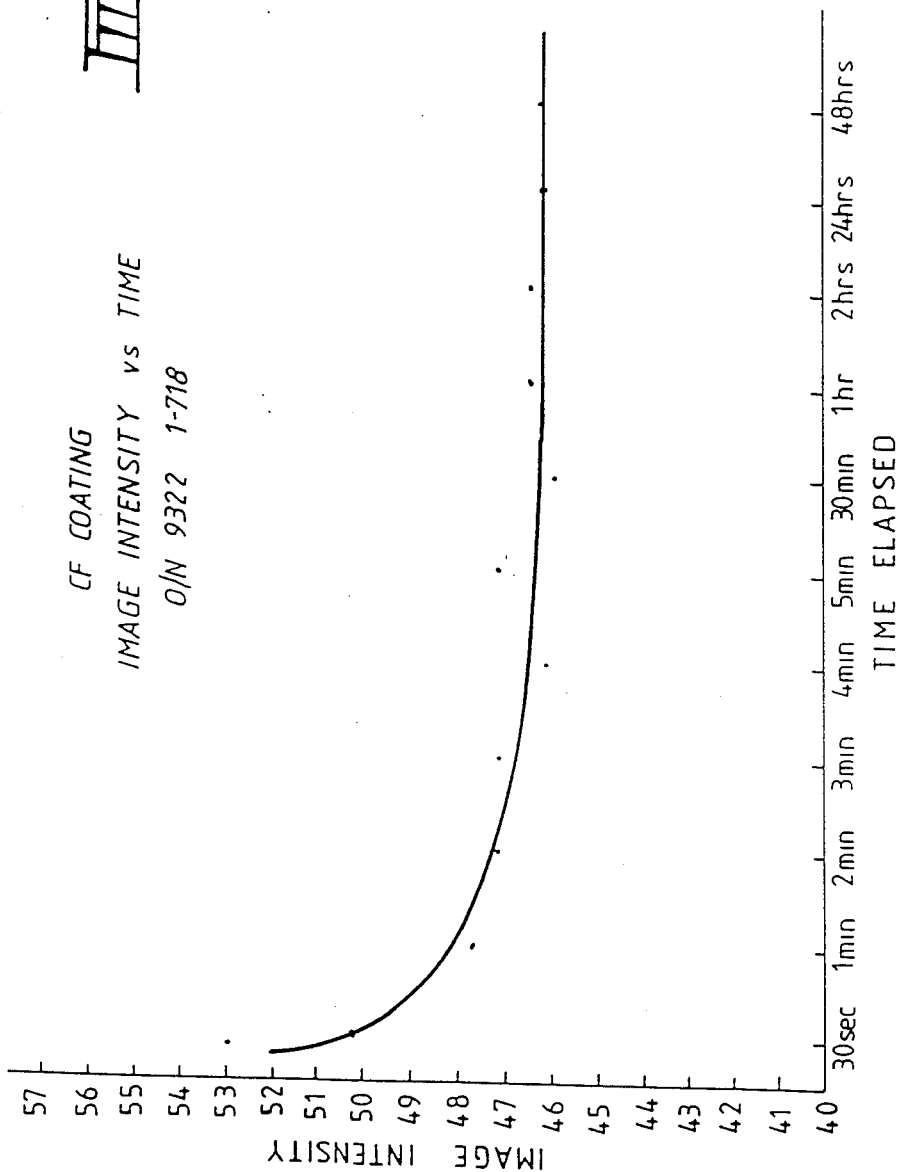

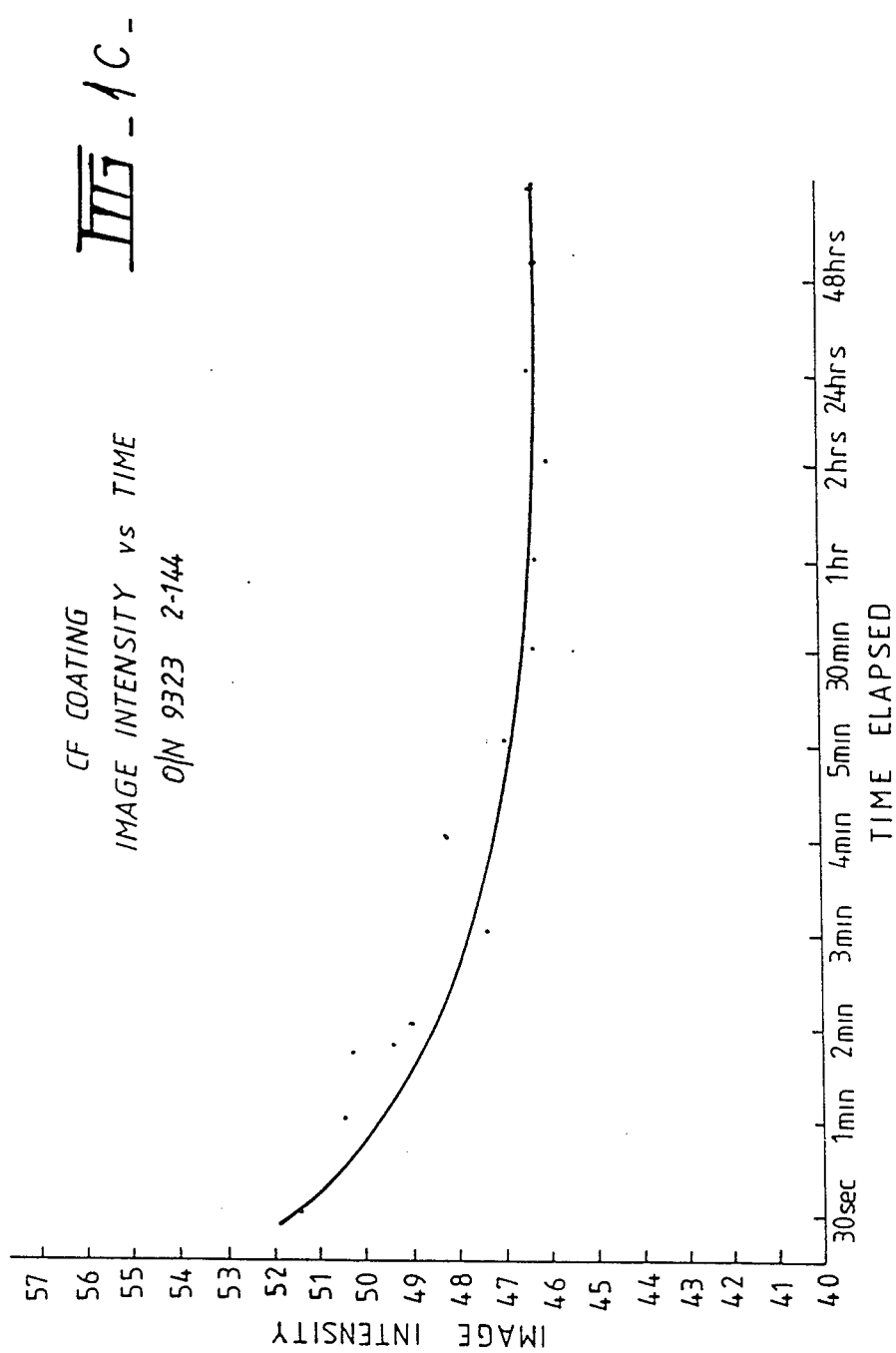

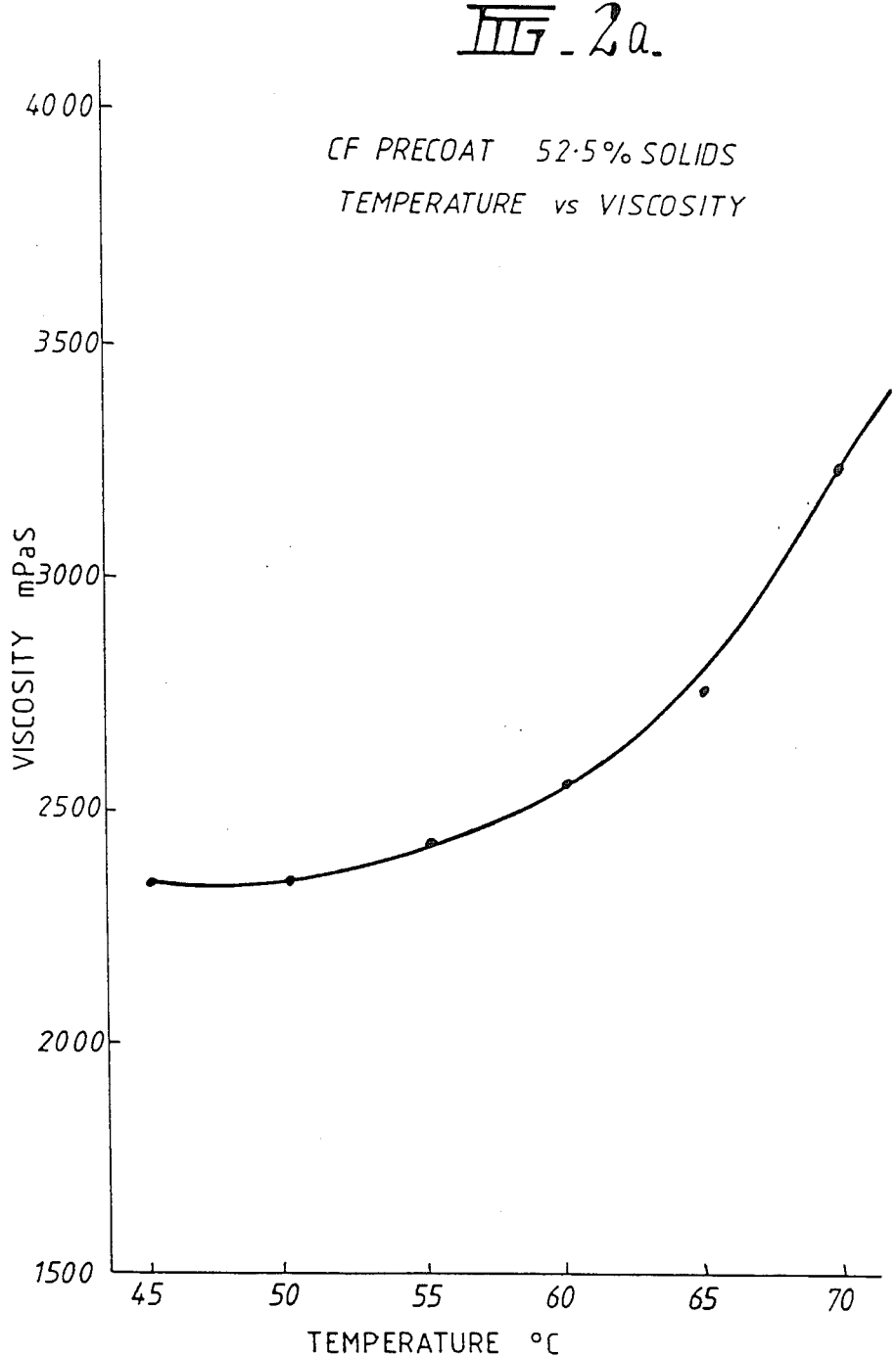

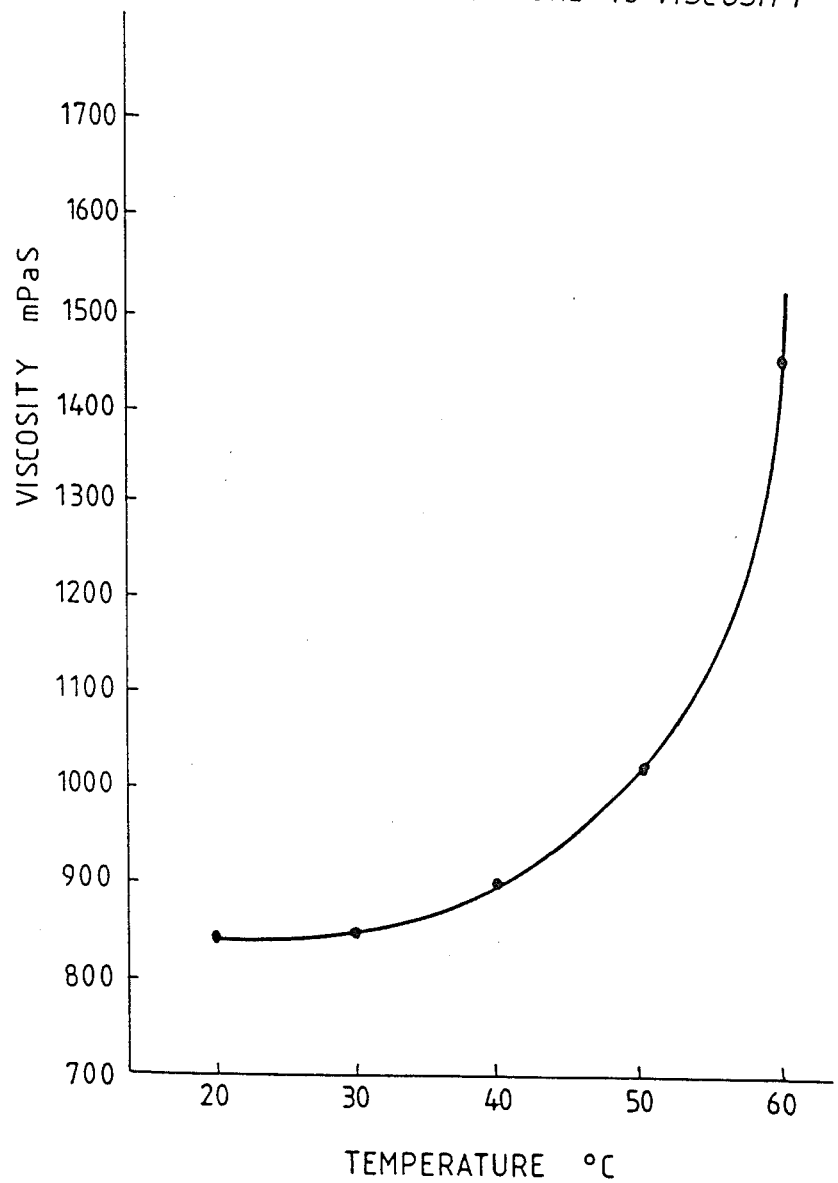

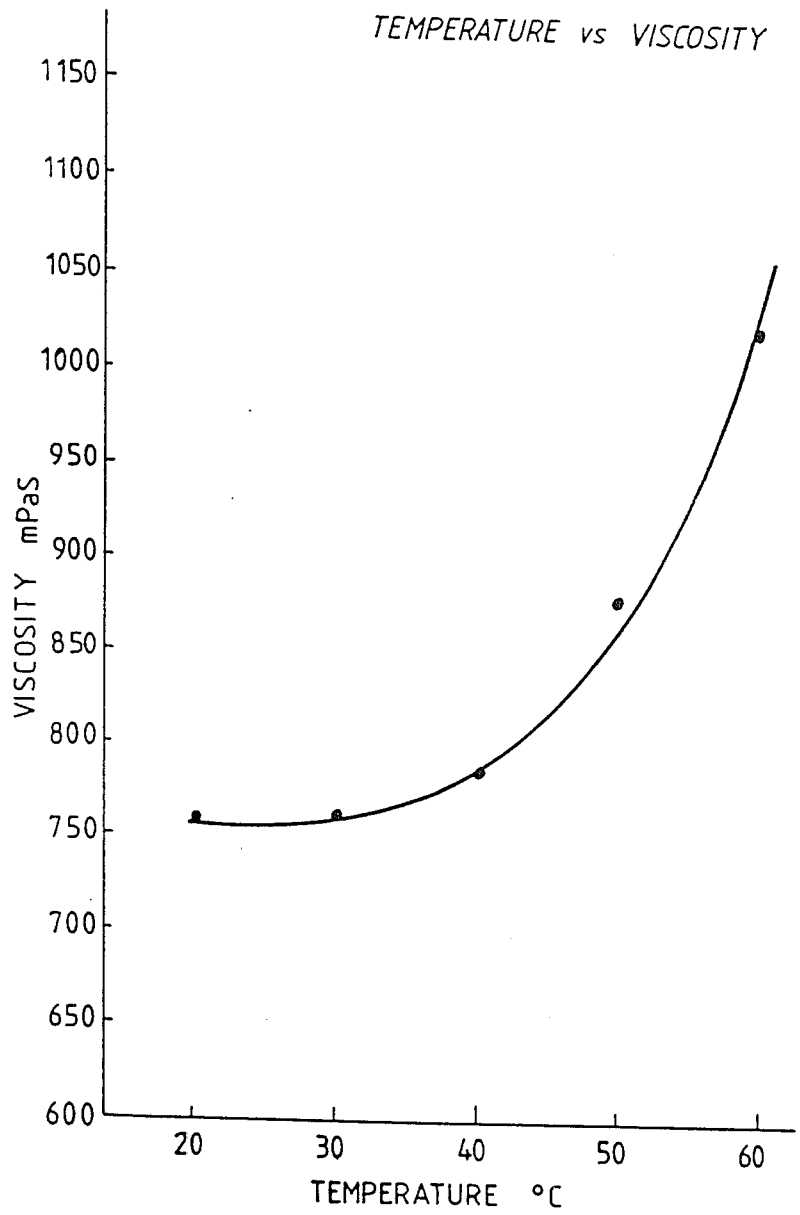

COATED FRONT COPY PAPER

This invention relates to the manufacture of coated front papers for carbonless copy sets.

The need to make available in one operation one or more copies of any document has led to the development of various types of carbon papers in which a sheet of paper having one side coated with a coloured pigment, such as carbon black, is inserted between an original and a blank sheet of paper in such a manner that the transfer of pigment to the blank sheet of paper is accomplished by mechanical means.

This system has the disadvantages of:
(i) necessitating the insertion of the pigment-containing paper to cover exactly the blank paper which is to become the copy,
(ii) producing easily-smudged copies,
(iii) limitation on the number of copies that can be made,
(iv) ease of pigment transfer to clothes and skin during handling.

As a result of the aforementioned disadvantages National Cash Register Corporation developed a pressure sensitive system designated as 'no carbon required' or carbonless copy paper.

In this system, (e.g. Australian Pat. No. 413,452) encapsulated colour precursors are coated on to the back of a record sheet. The coated side of the sheet is placed in intimate contact with a record sheet, the top of which has been coated with an acidic material such as phenolic resin or acid clays. The application of pressure to the top sheet ruptures the capsules containing the colourless dye, with the latter migrating to the coated second sheet where the acid clay or phenolic resin reacts with the carbonless dye to develop an image.

This particular system is superior to the carbon paper system in that it has minimised or eliminated some of the disadvantages of that system. If the 'no carbon required' system could be developed to its maximum potential then the following parameters and concepts would apply:
(a) Maximisation of the number of copies available, because the medium on to which the dye and reactive coatings are applied would be of a nature that does not retard transmittance of impact force due to absorption by air pockets.
(b) Substantial lowering of the cost of the reactive coating by reduction of the amounts of binder and reactive material (acid clay or phenolic resin) required and an overall reduction in the total amount of reactive coating applied.
(c) Minimisation of the coating substrate grammage without impairing its barrier qualities, which are necessary to prevent reaction between the reactive coating and the encapsulated dye coating of coated front and back (CFB) sheets.
(d) Maximisation of the resistance to image fading.
(e) Maximisation of image intensity.
(f) Reduction of wicking tendency in subsequent copies.
(g) Maximisation of resistance of the image to aging.
(h) Avoidance of premature colour development caused by bleeding of the colour precursor on the CFB sheet through to the reactive coated front (CF) coating.

We have now found that a particular preparation of carboxylated soybean protein, when added to the coating mixture produces a coating with improved properties compared to those produced by the prior art methods.

Although we do not wish to be limited by any hypothetical or postulated mechanism for the observed beneficial effects, we believe that the carboxylated soybean protein binds to the clay in the coating, causing cross-linking of the clay particles and hence an increase in the void volume of the clay when dry. The coating does not penetrate into the substrate web, because the cross-linked clay particles are larger than the pore size of the substrate.

This results in an improvement in image sharpness and intensity, since the larger void volume in the dried coating results in greater penetration of the dye lactone, as well as providing a greater surface area for reaction with the lactone.

We have also unexpectedly found that the presence of protein in the composition prevents the composition from gelling at high temperatures, contrary to experience with normal high solids formulations. For the purposes of this specification, we define "high solids" as having a solids content of greater than 45%. It appears that the presence of protein causes the composition to have a low viscosity at high solids content, even at elevated temperature. Thus no heating of the composition is required before application to the paper web.

Although carboxylated soybean protein, pretreated by a different method, has been used for double-sided coating of paper for offset printing (Whalen-Shaw and Coco., Technical Association of the Pulp and Paper Industry of America, 1984), the compositions used in these studies did not contain any phenolic resin component, and there is no suggestion of this paradoxical viscosity property.

The CF formulation of the present invention provides the following advantages over the prior art in production of CF sheets:
(a) greater image clarity, i.e. less spread.
(b) greater image resistance to aging.
(c) greater image resistance to fading.
(d) greater rapidity of image formation.
(e) reduced phenolic resin requirement and hence reduced cost.
(f) reduced coat weight application and hence reduced cost.
(g) reduced viscosity at low temperature, hence no necessity to heat composition and reduction in cost.

According to one aspect of the present invention there is provided a coating composition comprising treated carboxylated soybean protein, which, together with known ingredients such as kaolin and carbonate pigments, binder, a phenolic resin or a melamine formaldehyde resin, and defoamer, and optionally including a modified starch and a coating lubricant will, when applied to one side of a thin flexible substrate, produce a CF sheet characterized by the improved properties described above.

Suitable phenolic resins for use in the coating composition include Bakelite 844 (Union Carbide Corp.), resin emulsions HRJ 4023 or HRJ 2270 (Schenectady Chemicals Inc.), para-phenyl phenol CKM-5254 or para-tert-butyl phenol PTBB (Mitsubishi Australia Ltd.) or resin RBE-40 (Abel Lemon and Co. Pty. Ltd.); a melamine formaldehyde resin may be used as an alternative to a phenolic resin.

Suitable coating lubricants include calcium stearate, hydroxy-substituted triols such as Pluradot (BASF) or Monolan PC (Diamond Shamrock (Australia) Pty. Ltd.).

Suitable defoamers include DNF 122 N.S. (Diamond Shamrock (Australia) Pty. Ltd.).

The wheat, corn or potato starch may be modified, for example by acid hydrolysis, addition of hydroxy groups, oxidation e.g. by treatment with ethylene oxide or hydroxyethylation, prior to use. Preferably the starch has not been treated with enzymes such as alpha-amylase. It may be possible to omit starch from the coating composition.

Suitable latexes include Acronal S360D (BASF), other acrylonitrile butylacrylate copolymers, and styrene butadiene latexes.

When the resin used is HRJ 4023, a dispersant is included in the coating composition.

Suitable pigments include No. 1 type coating clay, such as Ultrawhite 90 (Engelhard Minerals) or Hydragloss (Huber Corporation), and ultra fine ground carbonate or precipitated carbonate.

Preferably the pigment slurry is prepared in the presence of a dispersing agent. Suitable dispersing agents for use with clays include sodium polyacrylates such as Dispex N-40 (Allied Colloids) or Polysalt (BASF), sodium hexametaphosphate, Poise 520 or Coatex P90 (Societe d'Exploitation des Procedes). Slurries of ultra fine ground carbonate are prepared preferably with Coatex P90 or Poise 520 as dispersing agent.

Other additives commonly used in the preparation of coating compositions, such as optical brighteners, may also be included.

Preferably the coating composition is prepared as follows: to the coating clay and/or carbonate is added sufficient water to give a final solids content of 40–55%, preferably 45–50%, and ammonia to give a final pH in the mixture of 8.5–9.5. Then the following components are added: solubilized soybean protein, latex, starch, phenolic resin, lubricant, and defoamer. Alternatively the defoamer may be added immediately after the water.

According to another aspect of the invention, there is provided a method of preparation of the carboxylated soybean protein, characterized by the steps of
(a) Adding carboxylated soybean protein to water in a mixer.
(b) Continuing mixing to achieve an even dispersion.
(c) Heating the dispersion to a temperature of 58°–65° C. while continuing mixing.
(d) Adding sufficient ammonia solution to neutralize the carboxylic acid groups in the protein.
(e) Maintaining the temperature in the range 58°–65° C. until the reaction is complete as indicated by pH, or by complete dissolution of the protein, and
(f) Adding defoamer and mixing by gentle agitation.

Preferably in step (a) the concentration of solids is between 15 and 25% W/W.

Preferably in step (c) the heating is by live steam injection.

Preferably in step (d) the weight ratio of concentrated ammonia solution to protein is 12–15%.

Preferably in step (e) the time required is in the range 15–20 minutes.

Preferred embodiments of the invention will be further illustrated by the following non-limiting examples, with reference to the accompanying figures, in which:

FIG. 1 represents a comparison of image intensity versus time between prior art CF paper (FIG. 1a) and papers coated with compositions according to the invention (FIGS. 1b and 1c);

FIG. 2 represents measurements of viscosity versus temperature of the composition according to the invention, with FIG. 2a showing results for CF precoat having solids content 52.5%, FIG. 2b showing results for CF precoat having solids content 51.0% and FIG. 2c showing results for CF precoat having solids content 49.0%.

EXAMPLE 1

Preparation of Solubilized Protein

Samples of modified (carbosylated) soybean protein polymer (Procote 240) were obtained from the manufacturer, Ralston Purina Corp., for laboratory evaluation in blade coating formulations.

The manufacturer suggested to solubilize this protein by dispersing it in hot water (62° C.) and adding concentrated (33%) ammonia to the dispersion to give a final ammonia concentration of 120% of the weight of the polymer. This was found to be unsatisfactory, due to emission of a sulphurous odour shortly after preparation, and rapid darkening of the ammonia-treated soybean polymer. Prepared in this way, the material was unusable after 24 hours storage.

After experimentation we found that a satisfactory product was produced using concentrated ammonia of a weight ratio to the polymer of 10% although some darkening was still evident.

As a result of further investigations we found that a lighter coloured material of greater storage potential could be obtained if, instead of dispersing the protein in water at 62° C. initially and re-heating to 62° C. as recommended by the manufacturer, the soybean protein was dispersed in cold water and heated prior to neutralization.

Accordingly, in a preferred embodiment of the invention, a solubilized preparation of the carboxylated soybean protein which was suitable for use in coating compositions is prepared by:
(a) Adding carboxylated soybean protein to water in a mixer to a concentration of 15–25% (W/W) at ambient temperature.
(b) Continuing mixing to achieve an even dispersion.
(c) Heating the dispersion to a temperature of 58°–65° C. while continuing mixing.
(d) Adding sufficient ammonia solution to neutralize the carboxylic acid groups in the protein (Weight ratio of ammonia solution to protein = 12–15%)
(e) Maintaining the temperature in the range 58°–65° C. until the reaction is complete as indicated by pH or by complete dissolution of the protein. The end-point pH is in the range 8.8–9.2.

The resulting solution of the soybean protein is then ready for use in coating compositions.

EXAMPLE 2

Laboratory-scale Blade Coating Composition

A coating mixture for laboratory trials was prepared, with the following composition as calculated by weight on an oven-dry basis:
85 Parts No. 1 type coating clay
15 Parts Ultra fine ground carbonate (Hydrocarb 90)
7 Parts Soybean Polymer (ammonia-treated as in Example 1)

27 Parts Phenolic resin HRJ 2270
8 Parts Acronal S360D Latex
1 Part Monolan PC
0.1 Part Defoamer DNF 122 NS Paper coated in the laboratory using this composition showed no improvement in CF characteristics. However, the laboratory-scale coater employs low shear rates and hydrodynamic forces. Therefore the reaction of the soybean protein with the clay particles to create larger void spaces and improved coating holdout by controlled clay flocculation was occurring, but the desired result in terms of paper coating properties was not observed.

EXAMPLE 3

Mill Trial Using Trailing Blade Coater

In order to test whether coating at high shear rates would produce the desired effect, the following composition was used (all components calculated by weight on an oven-dry basis):

30 Parts Ultrawhite 90 clay (A no. 1 type 90 brightness clay)
70 Parts Hydragloss clay (A no. 1 high gloss clay)
3 Parts Soybean protein, solubilized as in Example 1
8 Parts Acronal S360D latex
0.3 Parts Co-binder latex (Acrosol C50L)
1.2 Parts Melamine formaldehyde resin
0.375 Parts Monolan PC
0.7 Parts Optical brightening agent (Tinopal ABP)
Formulation Solids: 60%

The standard formulation used as a control in the blade coating trial was, on an oven dry basis:

30 Parts Ultrawhite 90 clay
70 Parts Hydragloss clay
0.2 Parts Carboxymethyl cellulose (Finnfix 300)
7.5 Parts Enzyme converted wheat starch (In house conversion)
5.5 Parts Acronal S360D latex
1.2 Parts Melamine formaldehyde resin
0.375 Parts Monolan PC
0.7 Parts Optical brightening agent
0.375 Parts Primal ASE 60 (An alkali swellable latex used for viscosity control)
Formulation Solids: 55%

In both cases the substrate used was a production quality light weight paper, a combination of refiner ground wood produced from *Pinus radiata*, semi-chemical pulp produced from eucalypt, and long-fibre kraft pulp.

The total binder content in the coating mixture was 11.3 parts in the trial mixture (latex+protein) and 13 parts in the control (latex+starch). The total coat weight addition in both cases was 15 gm/m$^2$.

Results were assessed by measurements of paper gloss and ink gloss, measured on both the felt side and the wire side of the coated paper web. These results are summarized in Table 1.

TABLE 1

|  | Composition containing modified soybean protein | | Control composition | |
| --- | --- | --- | --- | --- |
|  | Felt Side | Wire Side | Felt Side | Wire Side |
| Paper gloss | 52 | 49 | 42 | 41 |
|  | 48.2 | 39.9 | 34.7 | 31.1 |
|  |  |  | 31.1 | 37.0 |
|  |  |  | 38.1 | 41.5 |
| Ink gloss | 56.3 | 48.6 | 40.6 | 48.4 |
|  |  |  | 43.1 | 46.2 |

TABLE 1-continued

|  | Composition containing modified soybean protein | | Control composition | |
| --- | --- | --- | --- | --- |
|  | Felt Side | Wire Side | Felt Side | Wire Side |
|  |  |  | 45.1 | 49.6 |

The improvement in gloss qualities was maintained, even when the coat weight was reduced by 3 gm/m$^2$ (20%) or by 29%. These results are illustrated in Table 2. Both paper gloss and ink gloss are comparable to or superior to those obtained with the control composition at 15 gm/m$^2$.

TABLE 2

| Reduction in coat weight | Measurement | Composition containing modified soybean protein | |
| --- | --- | --- | --- |
|  |  | Felt Side | Wire Side |
| 20% (3 gm/m$^2$) | Paper gloss | 47.0 | 40.0 |
|  | Ink gloss | 50.4 | 47.2 |
| 29% | Paper gloss | 44.6 | 33.3 |
|  | Ink gloss | 50.7 | 34.1 |

The results of this experiment demonstrated that at the same coat weight addition but lower binder content a soybean protein-containing formulation achieved improved coating holdout, resulting in significant increase in fibre coverage, and reduced coating pits and hence higher ink gloss. Indicative of the improved coating holdout was the fact that the coat weight was reduced by 29%, but the coverage achieved was equal to that obtained without the soybean protein.

The results obtained on the blade coater were considered in the context of CF coating formulations for the gate roll size press to achieve superior image properties and/or cost advantages compared to products prepared by previously known processes.

EXAMPLE 4

Scanning Electron Microscopy of Coated Papers

Previously known CF formulations penetrate the substrate to some degree and leave fibres on or near the coated surface. On drying, pitting occurs due to coating shrinkage. The colourless dye, once released from the coated back (CB) coat, migrates to this pitted surface, and on contact forms an image which is distorted by surface irregularities. Excessive absorption into macro pores, or along hygroscopic structures such as cellular fibres, will reduce the image intensity.

We have found that coating compositions containing our solubilized soybean protein produce a coating which does not significantly penetrate the substrate surface, and which shows reduced pitting compared to previously known compositions.

Scanning electron micrographs taken using an ISI Super IIIA electron microscope at magnification ×70, and tilt angle 45° showed that paper coated with the control coating composition of Example 3, containing no soybean protein, at coat weight 15 gm/m$^2$, had numerous pits in the coating, and fibres protruding from the surface. In contrast, paper coated with a composition containing the solubilized soybean protein prepared as in Example 2, using the same coat weight as for the control, showed a marked reduction in the number of pits and visible fibres.

Paper coated as for the first experiment, but at a coat weight reduced by 3 gm/m$^2$, or with a reduction in coat weight of 29% compared to the first experiment, showed that despite the reduction in coat weight, the quality of the coating is largely maintained. The significantly improved coating holdout obtained during mill trials presents a more even coated surface of more uniform microporosity, and hence the colourless dye from the CB coat is less distorted by dye loss into coating pits or through wicking along fibres at or near the coated surface.

In addition, the controlled increase of coating void volume allows greater surface area for reaction of the CF coat with the dye; hence intensity of the image is increased and/or the quantity of reactive phenolic resin can be reduced along with a CF coat weight reduction.

EXAMPLE 5

Mill Trial Using Gate Roll Size Press

Production-scale trials were also performed on a gate roll size press, utilizing a standard formulation for use on that machine with the addition of solubilized soybean protein prepared as in Example 1. Improved coating was observed, similar to that found in Example 3.

EXAMPLE 6

Mill Trial Using Blade Coater

A production scale coating trial was performed at applicant's Wesley Vale mill. The coating composition contained phenolic resin HRJ 4023.

Webs from O/N 9322 and 9323 were coated at No. 1 head with CF coat Lab. No. 3662 (One (1) 56% batch was used). Fieldsize 6360 containing polyurethane was applied to the 2nd head at a rate of 2 gsm O.D.

Samples were obtained from each web No. for image intensity testing.

Tables 1 and 2 show paper properties of the CF paper obtained ex Paper Machine.

Porosity of O/N 9323 ex Coater was 70 points higher than standard while O/N 9322 was up 40 points.

O/N 9322 was 2.1 O.D. gsm higher than standard at No. 1 head.

Other paper properties were within the standard range.

The image intensity of copies produced using CF paper thus prepared was measured as follows:
1. 20 cm×3 cm strips are cut out of the test sample (usually 6 sample strips are obtained).
2. The coated sides of these samples are placed in contact with a standard CB coated, 20 cm×3 cm strip.
3. The samples are held together with the CB coated strip on top of the test strip and both are clamped under the 'emulsion masher' image marking wheel.
4. Image marking pressure is set to 150 psi and sample is now ready for imaging.
5. At this stage the Minolta reflectance meter is calibrated and set to the Yxy mode for reflectance measuring.
6. After calibration, imaging of the sample may be carried out by simply switching machine on. The length of the sample strip passes under imaging wheel. Care should be taken in making sure that an unimaged area is also present on the sample.
7. Once the sample has passed through the imaging process, 1 minute should elapse before the reflectance reading is taken. The sample must be unclamped before removal from the 'emulsion masher' and the CB sheet separated from the test strip.
8. After one minute, two (2) Yxy readings are taken on the white unimaged area of the sample, followed by three (3) Yxy readings on the imaged area.
9. The two white readings are averaged and the three image readings averaged.
10. Image Intensity % is given as $$\frac{\text{Average of image readings}}{\text{Average of white readings}} \times 100$$

Improved image intensity was noted with all web numbers except web No. 1-602 of O/N 9323. Average image intensity over the 5 reels was 1.4 points lower than the commercially accepted standard of 51.3. This indicates a better image intensity compared to prior art CF papers.

Note: This average includes the higher reading of 52.8 obtained on reel.

O/N 9322 base (barrier coated) has a lower porosity but higher smoothness than reel 1-602 O/N 9321 (water leaf base). O/N 9322 also has a better image intensity than reel 1-602 O/N 9323 which suggests that base smoothness plays an important role in determining image intensity.

Web No. 2/143 ex O/N 9323 was used to prepare a CFB sheet. The CF precoated paper ex Wesley Vale was coated with coated back (CB) coating, oven dry coal weight pickup (O.D. CWPU) of 4.5 gsm.

The CF paper was within standard specification for image intensity and handling specification for image intensity and handling characteristics (calender and scuff)—see Table 4.

The unacceptable image intensity of paper produced on O/No. 9322 is considered to result from an out of standard base paper smoothness, i.e. the base was rougher than those previously used.

TABLE 1

Paper Properties Ex No. 11 Paper Machine O/N 9323 and O/N 9322

| Test | Standard | O/N 9323 (2/143) | O/N 9322 |
|---|---|---|---|
| Grammage (gsm) | 50 | 45.3 | 52.4 |
| Thickness (um) | 310 | 316 | 309 |
| Density (g/mL) | 0.65 | 0.58 | 0.68 |
| Residue ex Reel (%) | 12.4 | 6.5 | 11.5 |
| Moisture at Reel (%) | 6.5 | 6.0 | 7.6 |
| Cobb (gsm) | 20–30 | 44 | 34 |
| Smoothness T/S | 130 | 320 | 115 |
| (mls/10 min) W/S | max. | 240 | 135 |
| Opacity (P.O.) | 88.5 | 85.1 | 89.8 |
| Porosity (SP) | 150 | 195 | 105 |
| Formation Grading | B+ | B | B |
| Hunterlab | | | |
| L | 85.8 | 89.1 | 85.8 |
| a | 1.2 | 1.3 | 0.6 |
| b | 4.1 | 4.4 | 4.4 |
| Size Press Pick-Up (gsm) | 3.0–4.0 | Nil | not tested Target 3.0 |
| Wax Pick | — | — | 11/12 |

TABLE 2

Paper Properties Ex Coater CD 15 O/N 9323 and O/N 9322

| Test | Standard | O/N 9323 | O/N 9322 |
|---|---|---|---|
| Grammage (gsm) | 54.0, 59.0 | 54.5 | 58.5 |
| Thickness (um) | — | 285 | 293 |

TABLE 2-continued

Paper Properties Ex Coater
CD 15 O/N 9323 and O/N 9322

| Test | Standard | O/N 9323 | O/N 9322 |
|---|---|---|---|
| Density | — | 0.78 | 0.80 |
| Sheffield Finish (mls/10 min) | 60-90 | T/S - 70<br>W/S - 100 | T/S - 55<br>W/S - 105 |
| Porosity | 25-45 | 117/82 | 88/56 |
| Opacity | 92 min. | 92 | 92 |
| Brightness | 68 min. | 74.7 | 71.9 |
| Moisture (%) | 7.0 | 6.9 | 7.2 |
| O.D. CWPU (gsm) | | | |
| Head 1 | 6.5 | 7.0 | 8.6 |
| Head 2 | 2.0 | — | — |

TABLE 3

Image Intensity for O/N 9322 and O/N 9323

| Order Number | Web No. | Image Intensity |
|---|---|---|
| Standard | — | 51.3 |
| O/N 9322 | 1-717 | 49.3 |
| O/N 9322 | 1-718 | 49.7 |
| O/N 9323 | 1-602 | 52.8 |
| O/N 9323 | 2-143 | 48.7 |
| O/N 9323 | 2-144 | 49.1 |

TABLE 4

Wesley Vale CFB Coated (CF Precoated)
Trial Paper Properties

| Test | Standard | Wesley Vale CF Precoated Paper |
|---|---|---|
| Calender (Image Intensity) | Max. 63, Target 58 | |
| CB/CFS | — | 56.1 |
| CF/CBS | — | 58.3 |
| Scuff (Handling) | | |
| CB/CFS | 80 min. | 85.4 |
| CF/CBS | 78 min. | — |
| Moisture (%) | 5.7 | 6.3 |
| Coat Weight Pick Up | — | 4.6 |
| Curl | ¼" | ¼" |
| Base Moisture | — | 6.6 |
| Base Grammage | — | 47.7 |
| Coated Grammage | — | 54.2 |
| Brightness | — | A - 72.1<br>B - 66.5 |
| Hunterlab | | |
| L | — | A - 89.0<br>B - 87.6 |
| a | — | A - 2.0<br>B - 0.8 |
| b | — | A - 4.0<br>B - 7.5 |

EXAMPLE 7

Optimization of Image Intensity

In order to optimize conditions for coating of the paper in terms of eventual image production, papers coated in the laboratory under various conditions were compared with a standard prior art CF paper, Omna (Nashua), using a standard prior art CB paper. Image intensity was assessed.

Parameters tested were:

Paper type, grade of paper, presence or absence of barrier coat between base paper and CF coating, amount of modified carboxylated soybean protein, presence or absence of sulphite in the barrier coat, type and amount of phenolic resin, varying O.D. CWPU, base paper smoothness, clay content of coating composition, latex type, and carbonate pigment type and amount.

It was found that significant variation in the image intensity could be obtained by changing the method of feeding the paper samples into the crusher. If the crusher is closed on both paper samples at the same time a much higher image intensity value is obtained (as much as 10-15% difference) in comparison to closing the clamp on the CB paper and feeding the CF coated sheet through after turning on the motor. A further difference is also obtained if the clamp is closed without any paper in the gap and both sheets are fed through after turning on the motor.

The following did not significantly affect image intensity or colour: amount of soybean protein, O.D. CWPU, base paper smoothness.

The presence of sulphite in the barrier coat did not affect image intensity, but it did reduce the tendency of the image to have a greenish hue.

No significant difference in the colour of the image was found when different types of paper base were used for coating. The colour of the base sheet appears to have an overriding effect.

The grade of paper, presence of a barrier coating resin type, and possibly amount, clay and latex, and pigment quantity all affected the image, as follows:

Several grades of paper were coated with Wesley Vale CF coating, Lab. No. 3544 (O.D. CWPU 6-7 gsm), and subjected to the standard image intensity test.

(1) Imported Japanese base for NCR paper
(2) Unsized Twincote Sheet 60 gsm
(3) Australcote Base 66.5 gsm
(4) Burnie Woodfree Base 85 gsm None of the base papers tested resulted in an image as dense as that achieved by using the standard Omna CF and standard CB.

TABLE 5

CF Coated Base Paper

| Sample | CF Coat O.D CWPU (g) | Image Intensity (%) | Minolta L | a | b | Porosity ¾" I.D |
|---|---|---|---|---|---|---|
| CF Std. | — | 53.3 | 66.0 | −2.1 | +2.7 | |
| Japanese | 5.3 | 60.0 | 72.1 | −4.4 | +1.9 | 140 |
| Burnie W/F | 6.7 | 73.2 | 76.7 | −4.4 | +4.4 | 270 |
| Australcote | 6.5 | 70.4 | 73.9 | −4.3 | +5.5 | 32 |
| Twincote (unsized) | 6.6 | 70.4 | 74.7 | −4.2 | +4.7 | 241 |

Note: The lower the image intensity value the darker the image.

Each of the above base papers were then coated, first with 2-3 gsm O.D. CWPU Barrier Coating using Graphsize A with Fieldsize 6360 followed by 6-7 gsm O.D. CWPU of the standard CF coating, Lab. No. 3544. Each of the coated papers was then subjected to the standard image intensity test.

The addition of the barrier coat to the base paper before the addition of the CF coat improved the density of the image but they still did not approach the image density of the control CF paper.

TABLE 6

Barrier Coated - CF Coated Base

| Sample | Barrier Coat OD CWPU | CF Coat OD CWPU | Image Intensity (%) | Minolta L | a | b |
|---|---|---|---|---|---|---|
| CF Std. | — | — | 52.9 | 63.7 | −0.1 | +1.3 |
| Japanese | 2.6 | 5.9 | 60.0 | 73.6 | −3.2 | +1.5 |
| Burnie W/F | 2.6 | 5.5 | 70.5 | 75.0 | −2.7 | +2.9 |
| Australcote | 3.2 | 6.5 | 67.3 | 72.3 | −2.1 | +3.4 |

TABLE 6-continued

Barrier Coated - CF Coated Base

| Sample | Barrier Coat OD CWPU | CF Coat OD CWPU | Image Intensity (%) | Minolta L | a | b |
|---|---|---|---|---|---|---|
| Twincote | 2.4 | 5.8 | 68.1 | 72.5 | −2.4 | +4.8 |

Base paper smoothness did not affect the image intensity.

The use of HRJ 4023 resin resulted in a much darker image—51.2% compared to 60.0% using the resin HRJ 2270. The coating composition contained 30 parts of resin.

Increasing the amount of clay in the CF coat by five parts resulted in a much poorer image—66.5% compared to 60.0% for the standard CF coat using HRJ 2270.

TABLE 7

The Effect of Base Paper Smoothness, Resin Type And Amount of Clay Used.

| Sample Description | CWPU | Finish | Image Intensity (%) |
|---|---|---|---|
| 1. Std. CF Coat on Std. Base | 6.7 | 253.2 | 60.1 |
| Std. CF Coat on S/Cal CF Base | 5.92 | 108 | 66.5 |
| Std. CF Coat on S/Cal CF Base using 2270 Resin | 5.45 | 97 | 68.5 |
| 2. CF Coat - HRJ 4023 - Std. Base | 6.85 | 251.7 | 51.2 |
| 3. CF Coat - 90 parts Spray Satin 10 parts Hydrocarb 90 - Std. Base using 2270 Resin | 7.21 | 260.0 | 66.5 |

1. The use of modified Dow 670 latex (styrene butadiene latex) in place of Acronal S360D latex (acrylic latex) resulted in a much darker image in comparison to the control using the resin HRJ 4023, i.e. 43.2% compared to 51.2%.
Dow 670 latex was found to be unstable when used with the gate roll size press. The formulation of the latex was modified by Dow in order to increase its mechanical stability; the modified latex is known as Dow 670 W.
2. Replacing the Hydrocarb 90 with standard carbonate pigment resulted in an equivalent image intensity in comparison to the control, i.e. 50.9% compared to 51.2%.
3. Increasing the amount of Hydrocarb 90 by 5 parts to 20 parts in the formulation also resulted in a poorer image, 57.3% compared to 51.2%.

TABLE 8

The Effect of Different Latex and Varying the Amount and Type of Carbonate.

| Sample Description | CWPU | Image Intensity (%) | L | a | b |
|---|---|---|---|---|---|
| 1. CF Coat using Dow 670 (HRJ 4023 Resin) | 9.3 | 43.2 | 63.3 | −1.9 | +1.0 |
| 2. CF Coat using Carbonate instead of Hydrocarb 90 (HRJ 4023 Resin) | 9.5 | 50.9 | 67.8 | −2.1 | +2.0 |
| 3. CF Coat using 20 parts Hydrocarb 90 (HRJ 4023 Resin) | 9.3 | 57.3 | 71.2 | −2.4 | +2.7 |

The effect of using Modified Dow 670 latex in place of Acronal S360D and the effect of using the resin HRJ 4023 in place of HRJ 2270 was re-assessed following the findings on the effect of the method of feeding the paper samples into the crusher.

From these results it appears that the use of the resin 4023 in conjunction with either modified Dow 670 or Acronal S360D gave an acceptable image intensity in comparison to the control Omna standard.

TABLE 9

| Sample Description | Solids (%) | pH | Brookfield Viscosity (mPaS) | O.D. CWPU | Image Intensity (%) |
|---|---|---|---|---|---|
| Acronal S360D Std. Carbonate Resin HRJ 2270 | 52.3 | 8.8 | 1040 | 8.5–9.5 | 61.3 |
| Modified Dow 670 Std. Carbonate Resin HRJ 2270 | 52.0 | 8.7 | 1160 | 8.5–9.5 | 60.4 |
| Acronal S360D Std. Carbonate Resin HRJ 4023 | 52.1 | 8.6 | 1000 | 8.5–9.5 | 50.9 |
| Modified Dow 670 Std. Carbonate Resin HRJ 4023 | 52.7 | 8.6 | 1290 | 8.5–9.5 | 52.9 |
| Std. Omna | — | — | — | — | 55.1 |

The greenish hue of the image was largely overcome by using the resin HRJ 4023 in place of the resin HRJ 2270.

The Japanese base paper did not show a significant improvement in image density after applying the barrier coat before the CF coat. This is most probably due to predominant starch sizing on the surface and also the results of its very good formation, relatively high density and good finish.

It appears that the use of Modified Dow 670 latex in the CF coat results, at the least, in an equivalent image intensity to the coating utilizing Acronal S360D latex.

Also the use of standard carbonate in place of Hydrocarb 90 results in an equivalent image intensity which would result in a considerable cost saving.

The O.D. CWPU, parts of PP240 and parts of resin does not appear to have a significant influence on the image intensity over the ranges tested.

The use of the resin HRJ 4023 results in a darker image in comparison to the image obtained using the resin HRJ 2270.

We conclude that a suitable CF formulation having optimum image properties could contain modified carboxylated soybean protein prepared as described above, modified Dow 670 latex, 15 parts of standard carbonate, and 33 parts of resin HRJ 4023.

Our mill trials have shown PP 240 to have a significant effect on coated paper properties when used either at the gate roll size press or the blade coater, whereas laboratory work indicated no benefits at all as has the abovementioned laboratory work on CF coating.

It should also be pointed out that mill trials using the CF coat have shown that increasing the amount of phenolic resin HRJ 2270 in the CF coating has led to an improved image intensity. Furthermore, increasing the O.D. CWPU has led to improved image intensity which again is not consistent with the laboratory results.

EXAMPLE 8

Rheology of the CF Coating

The rheological properties of the coating formulation selected as optimal in the previous example were tested. The results are shown below. Viscosity was measured after one hour stirring in a Kaltec viscometer. The coating composition contained standard carbonate 15 parts, HRJ 4023 resin 33 parts, PP240 soybean protein 7 parts, and modified Dow 670 latex 8 parts. Total solids comprised 52.6%.

| | |
|---|---|
| Temperature | 25° C. |
| pH | 9.1 |
| Apparent Newtonian viscosity (mPaS) | 1000 |

EXAMPLE 9

Change in Image Intensity with Time

The effect of time on image intensity was assessed by comparing results obtained with a standard prior art CF paper, Omna (Nashua), and papers coated according to the present invention, O/N 9322 1-718 and O/N 9323 2-144. Image intensity was assessed at 30 sec—48 hour after image formation. The results are shown in FIG. 1. Curve (a) represents Omna, curves (b) and (c) the papers according to the invention. It is clear that image development is faster in curve (b), O/N 9322 1-718 than in the standard, with a plateau being reached by one hour compared to approximately 24 hours with Omna. O/N 9322 2-144 shows a flatter curve, but still reaches a plateau by 2 hours. Thus both samples according to the invention show more rapid image formation than the prior art standard.

EXAMPLE 10

Viscosity-Temperature Relationship

The application of coatings using a Gate Roll Size Press is significantly affected by the viscosity of the material being applied. The experience with conventional precoat formulations used on No. 11 machine is that an increase in temperature to around 70° C. will reduce viscosity and hence help to minimise film split pattern.

To ensure that the experimental CF formulation is applied at minimum viscosity for the required solids content of 52.5%, a series of temperature viscosity determinations was undertaken.

The viscosity temperature relationship was measured for formulation 3662 at 52.5° C. The results are shown in FIG. 2(a).

This demonstrated that contrary to expectations the viscosity increases with increasing temperature. This behaviour was reversible, i.e. on cooling the viscosity decreased according to the same relationship.

Temperature viscosity curves at 51% and 49% solids showed a similar reversible temperature viscosity relationship as for the 52.5% solids coating. This is shown in FIGS. 2(b) and (c).

This particular formulation differs from prior art precoat formulations in that it contains a carboxylated protein and phenolic resin. To identify the material causing the unexpected temperature viscosity relationship formulations were prepared in which:

(a) the protein was replaced with starch and latex in the same ratio as for the prior art (3662a).

(b) protein was deleted with no replacement (3662b). Results are shown in Table 10.

The viscosity of 3662a at 35° C. was 2,200 mPaS. On heating to 50° C. the coating jelled. After cooling to 30° C. the viscosity was high at 30,000 mPaS.

The behavior of formulation 3662b was similar to 3662a. At 25° C. viscosity was 1460 mPaS but the formulation jelled at 50° C. This coating remained in a jelled form after cooling.

It is reasonable to conclude from these observations that the phenolic resin causes this inverse temperature relationship, but the inclusion of the carboxylated protein minimises the effect, and, contrary to current practice, the formulation should be run at 20°-30° C. at 50% solids for the gate roll size press application.

TABLE 10

| | CF Formulations | | |
|---|---|---|---|
| | 3662 | 3662a | 3662b |
| Std. Clay | 85 | 85 | 85 |
| Std. Carbonate | 15 | 15 | 15 |
| Modified Starch | 3.5 | 7.0 | 3.5 |
| Latex | 3.5 | 7.0 | 3.5 |
| Phenolic Resin | 33.0 | 33.0 | 33.0 |
| Lubricant | 1.0 | 1.0 | 1.0 |
| Optical Brightening Agent | 0.25 | 0.25 | 0.25 |
| Protein | 7.0 | — | — |
| Solids | 52.5 | 52.5 | 52.5 |

Thus the formulations of the present invention can be used at high solid content but relatively low temperature, i.e. the coating composition need not be preheated before application to the paper.

It will be clearly understood that the invention in its general aspects is not limited to the specific details referred to hereinabove.

I claim:

1. A method for pre-treatment of carboxylated soybean protein, characterized by the steps of
   (a) adding carboxylated soybean protein to water in a mixer,
   (b) continuing mixing to achieve an even dispersion,
   (c) heating the dispersion to a temperature of 58°–65° C. while continuing mixing,
   (d) adding sufficient ammonia solution to neutralize the carboxylic acid groups in the protein,
   (e) maintaining the temperature in the range 58°–65° C. until the reaction is complete as indicated by pH, or by complete dissolution of the protein, and
   (f) adding defoamer and mixing by gentle agitation.

2. A method according to claim 1 wherein in step (a) the concentration of solids is between 15 and 25% w/w.

3. A method according to claim 1 wherein the heating in step (c) is by live steam injection.

4. A method according to claim 1 wherein in step (d) the weight ratio of concentrated ammonia solution to protein is 12-15%.

5. A method according to claim 1 wherein in step (e) the time required is in the range 15-20 minutes.

6. Coated front paper prepared using a composition according to claim 1.

7. Carboxylated soybean protein prepared according to claim 1.

8. A coating composition for coated front copy papers comprising pre-treated carboxylated soybean protein, pigment, binder, a phenolic resin or a melamine formaldehyde resin, and defoamer, wherein the carboxylated soybean protein is pre-treated by the steps of:
   (a) adding carboxylated soybean protein to water in a mixer,
   (b) continuing mixing to achieve an even dispersion,
   (c) heating the dispersion to a temperature of 58°–65° C. while continuing mixing,
   (d) adding sufficient ammonia solution to neutralize the carboxylic acid groups in the protein, and
   (e) maintaining the temperature in the range 58°–65° C. until the reaction is complete as indicated by pH, or by complete dissolution of the protein, and
   (f) adding defoamer and mixing by gentle agitation.

9. A method for preparing a coating composition according to claim 8, comprising the steps of
(a) adding sufficient water to the coating clay and/or carbonate to give a final solids content of 40-55%,
(b) adding ammonia to give a final pH in the mixture of 8.5-9.5 and
(c) adding the following components: solubilized soybean protein, binder and phenolic resin, wherein defoamer is added after step (a) or in step (c).

10. A composition according to claim 8, wherein the resin is selected from the group consisting of novolac resins and melamine formaldehyde resins.

11. A composition according to claim 8, wherein the binder is a latex.

12. A composition according to claim 8, which additionally incorporates a dispersant.

13. A composition according to claim 8, wherein the binder is a modified starch.

14. A composition according to claim 13, wherein the modified starch is a wheat, corn or potato starch treated by acid hydrolysis, addition of hydroxy groups, oxidation, or hydroxyethylation.

15. A method for coating paper characterized in that a high solids composition according to claim 8 is applied to the paper without preheating of the composition.

16. Coated front paper prepared by the method of claim 15.

* * * * *